United States Patent [19]

Herrera

[11] Patent Number: 5,065,518

[45] Date of Patent: Nov. 19, 1991

[54] FOOD PRODUCT MEASURING DEVICE

[76] Inventor: Michael L. Herrera, 676 Albona, Pomona, Calif. 91768

[21] Appl. No.: 570,334

[22] Filed: Aug. 21, 1990

[51] Int. Cl.$^5$ ............................................. G01B 3/14
[52] U.S. Cl. .................................... 33/1 BB; 33/524; 33/547; 33/555.1
[58] Field of Search .............. 33/1 B, 1 BB, 1 F, 524, 33/525, 545, 546, 547, 565, 555.1, 555.2, 501.45

[56] References Cited

U.S. PATENT DOCUMENTS

| | | | |
|---|---|---|---|
| 1,531,303 | 3/1925 | Miller | 33/524 |
| 2,014,190 | 9/1935 | Simon | 33/565 |
| 2,628,528 | 2/1953 | Dietrich et al. | 33/547 |
| 2,930,283 | 3/1960 | Smith et al. | 33/547 |
| 3,347,179 | 10/1967 | Haidinyak | 33/1 F |
| 4,422,241 | 12/1983 | Meeker | 33/1 BB |
| 4,566,192 | 1/1986 | Hankins et al. | 33/547 |

FOREIGN PATENT DOCUMENTS

| | | | |
|---|---|---|---|
| 0051510 | 3/1986 | Japan | 33/1 BB |
| 597588 | 10/1977 | Switzerland | 33/1 BB |
| 1585215 | 2/1981 | United Kingdom | 33/1 BB |

OTHER PUBLICATIONS

"Lathe and Drill Gage", *American Machinist*, Jan. 13, 1958, p. 170.

*Primary Examiner*—Thomas B. Will
*Attorney, Agent, or Firm*—Joseph C. Andras

[57] ABSTRACT

A measuring device for allowing a user to rapidly determine that an article such as a tortilla is properly sized and shaped. The measuring device consists of a transparent disc that is supported by a handle. The transparent disc includes a minimum size line and a maximum size line such that the user may place the transparent disc over the tortilla and then rapidly verify whether or not the edge of the tortilla falls between the minimum and maximum lines. The device may further include an optimum size line. The central portion of the disc is preferably transparent so that the user can inspect the surface of the tortilla. However, the central portion of the disc may also be opaque so that the user may focus his attention on whether or not the edge of the tortilla lies between the minimum and maximum lines.

2 Claims, 2 Drawing Sheets

FOOD PRODUCT MEASURING DEVICE

BACKGROUND OF THE INVENTION

1. Field of the Invention

The present invention relates generally to measuring devices and, more particularly, to a hand-held measuring apparatus for quickly and easily determining whether or not a food product is properly shaped and/or sized.

2. Description of Related Art

Measurement is a fundamental process in all production environments. In general, measurement involves comparing an article to be measured with some accepted standard. Exemplary general purpose measuring instruments include the familiar ruler, vernier calipers, and micrometers. Although such general purpose measuring instruments can be used in a variety of applications, they are not the best choice for repeatedly verifying the size and/or shape of a series of like articles.

Many food products, such as tortillas, are produced in a fast-moving assembly line environment. The size and shape of the tortilla may vary as a result of upstream changes in dough content, misalignment of machine components, etc. It is therefore necessary to periodically verify the size and shape of the product as part of quality control.

The known measuring instruments are generally unsuited for the repeated measurement of like shaped and sized articles. For example, if one were using an ordinary ruler to verify the size and shape of a tortilla, it would be necessary to make a time-consuming plurality of straight line measurements. Moreover, it is very difficult to use the known measuring instruments to measure product that is rapidly advancing on a conveyor belt.

SUMMARY OF THE INVENTION

It is an object of the present invention to overcome the above-described shortcomings in the prior art and, more particularly, to provide an improved measuring device for quick and easy visual verification of both the shape and size of a good product;

It is a further object of the present invention to provide a hand-held measuring device that can be used to verify the size and shape of a good product and, at the same time, allow the food product to be viewed through the measuring device so that its quality can also be verified; and It is a further object of the present invention to provide a food product measuring device that immediately communicates to the operator that the perimeter edges of a particularly shaped food product lie within an acceptable range.

In accordance with the above objects, the present invention is comprised of a planar member, at least an perimeter portion of the planar member being transparent; means for delineating an minimum perimeter and a maximum perimeter on the transparent portion, the minimum perimeter and maximum perimeter delineations corresponding to a minimum and maximum size of the article to be measured, respectively; and handle means for supporting said planar member over said article whereby a user may visually determine whether or not the article is properly sized by visually confirming that the outer edge of the article is visible between the minimum and maximum perimeter delineations of the transparent portion.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to make an improved food product measuring device.

The following description will focus on the measurement of tortillas which are generally round. However, the present invention can be practiced with other than tortillas and with food products having other than a round shape.

Figures 1, 2, 3:
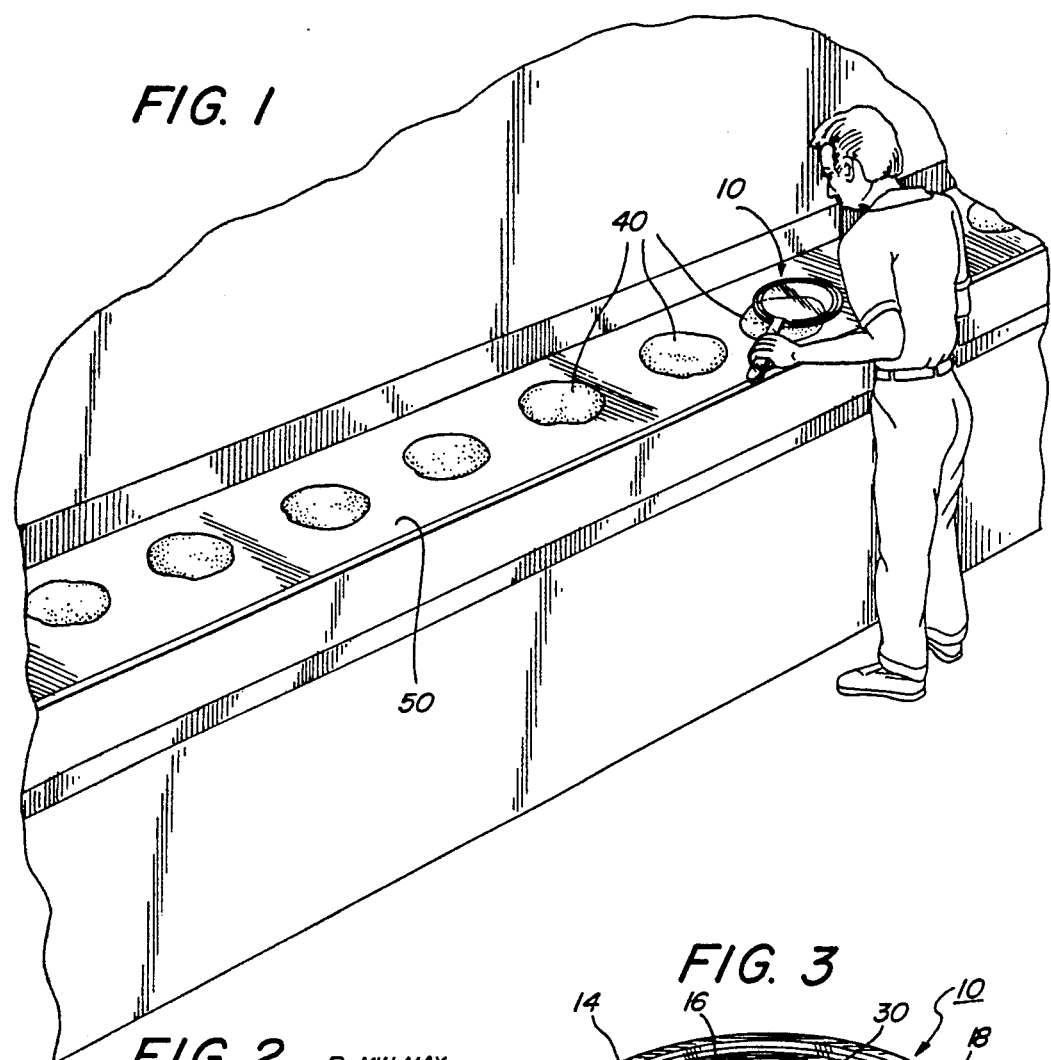
FIG. 1 is a perspective view of an operator using a food product measuring device according to the present invention to verify the size and shape of tortillas advancing on a conveyor belt.
FIG. 2 is a cutaway plan view of a measuring device according to the present invention showing the range of acceptance defined by adjacent markings.
FIG. 3 is a perspective view of a measuring device according to the present invention positioned over a tortilla food product to be measured.

The construction of a preferred embodiment of a food product measuring device 10 according to the present invention is best shown in FIG. 3. The food product measuring device 10 is generally comprised of a planar member 14 that is supported by a handle 12. In a preferred embodiment, the planar member 14 is round so as to generally match the shape of the tortillas 40 to be measured. The planar member 14 can be a solid member (i.e. a disc) or an annular member (i.e. a ring). The handle 12 should be considered exemplary of the many handle means that may be used for supporting the planar member over the food product to be measured.

In the preferred embodiment, the planar member 14 and the handle 12 are formed from a unitary sheet of plexiglass. The plexiglass is first cut into the pan-like shape depicted in FIG. 3. An angled portion 13 is then formed in the handle 12 so that the planar member 14 is supported somewhat below the handle 12 when held by a user. The angled portion 13 is formed by bending the handle 12 at the noted areas 15 and 17. In the preferred embodiment, these bends 15, 17 are formed by pressing the handle 12 about a heated rail.

The planar member 14 is comprised of a central portion 30. In the preferred embodiment, the central portion 30 is transparent so that, during a measuring operation, the tortilla can be viewed through the planar member 14.

Figure 4:
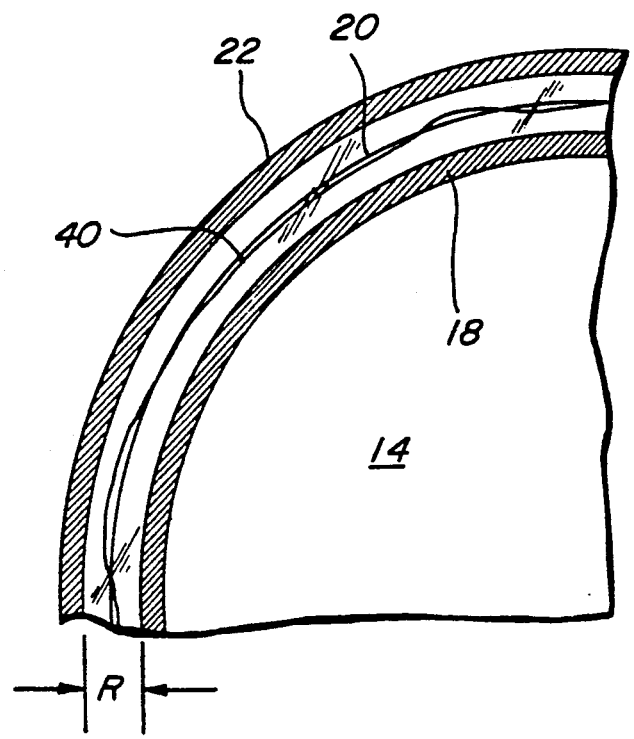
FIG. 4 is a partial plan view of a measuring device according to the present invention placed over an acceptable size tortilla.
Figure 5:
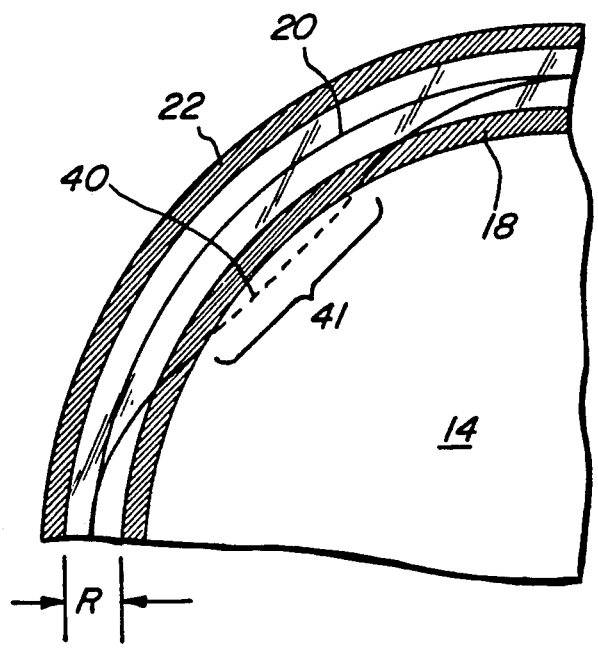
FIG. 5 is a partial plan view of a measuring device according to the present invention placed over an unacceptable size tortilla.

The planar member 14 carries a plurality of parallel markings or indicia 18, 20, 22 around the central portion 30 and near the outer edge of the planar member 14. Referring to FIG. 2, it can be seen that the indicia 18, 20, 22 respectively correspond to a minimum line, an optimum line, and a maximum line. The minimum line represents a minimum acceptable product size, the optimum lines represents an optimum product size, and the maximum line represents a maximum acceptable product size. The inner and outer markings 18, 22 are configured about the planar member 14 in such a way that the transparent acceptance range R defines an acceptable range in which the edges of the tortilla may lie. The acceptance range R is transparent so that the edge of the tortilla is visible therethrough. The minimum and maximum lines 18, 22 are preferably comprised of wide bands of a high contrast color relative to the tortillas 40 so that the user can readily determine whether or not the edge of the tortillas is present in the transparent acceptance range R. FIGS. 4 and 5 respectively show the measuring device 10 over an acceptable and unacceptable sized tortilla 40. In FIG. 4, the tortilla 40 is acceptable because the entire edge of the tortilla is visible in the acceptable range R. In FIG. 5, the tortilla is unacceptable because a portion 41 of the tortilla 40 is outside of the acceptable range R. Thus, when using the present invention, the production of an unacceptable tortilla 40 is readily apparent.

FIG. 1 is a perspective illustration which shows an operator verifying the size and shape of tortillas 40 advancing by him on a conveyor 50. The operator uses a measuring device 10 by simply placing it above the moving tortilla 40, as shown in FIGS. 1 and 3, and by then visually determining that all edges of the tortilla 40 are within the transparent acceptance range R.

The preferred embodiment further includes an optimum line 20 between the minimum and maximum lines 18, 22. The optimum line 20 corresponds to the optimum size of the tortilla 40 and provides the user with an indication of the tortilla's size and shape relative to the optimum achievable size and shape. For example, where a pressed flour tortilla 40 has an optimum size of 8 inches and a tolerance of $+\pm\frac{1}{4}$, the optimum line 20 would define an 8-inch-diameter circle, and the minimum and maximum lines 18, 22 would define $7\frac{3}{4}$-inch and $8\frac{1}{4}$-inch circles, respectively. By visually viewing the tortilla 40 through the transparent band R, it is possible to verify that the tortilla is within the acceptable range, and to further observe the size of the tortilla 40 relative to the desired optimum size. The optimum line 20 may be omitted altogether if the measuring device 10 is used only to make a "go" or "no-go" determination that the tortilla 40 falls between the minimum line 18 and the maximum lines 22.

The measuring device 10 according to the present invention may also include "cross-hair" indicia 16 for visually delineating sectors of the tortilla food product 40 to be measured. It is generally desirable to produce a tortilla 40 with a certain percentage of toast spots 42, 44, 46 on the tortilla 40 surface. It is also desirable to ensure that the toast spots 42, 44, 46 are spaced relatively evenly over the surface of the tortilla 40. The cross-hair indicia 16 divide the tortilla surface into four equal sized sectors, making it quick and simple for the operator to verify that the toast spots 42, 44, 46 within each sector are relatively equal. If a larger percentage of toast spots 42, 44, 46 are occurring in a particular sector, the operator is alerted and can then attempt to adjust the problem upstream.

In the above description, the central portion 30 is translucent. However, the central portion 30 may also be opaque. An opaque central portion may be desirable so that the operator can focus on the presence of the tortilla in the acceptance range R and not be distracted by the presence of the tortilla in the central portion 30.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An apparatus for visually determining whether a tortilla is properly sized, comprising:
    a planar disc member, at least an annular portion of the planar member being transparent;
    means for delineating a minimum tortilla size line and a maximum tortilla size line on the transparent annular portion, the minimum tortilla size line and the maximum tortilla size line corresponding to a predetermined range of acceptable tortilla size;
    handle means for supporting said planar disc member over said tortilla whereby a user may visually determine whether or not the tortilla is within the predetermined range of acceptable tortilla size by visually confirming that the outer edge of the tortilla is visible between the minimum tortilla size line and the maximum tortilla size line of the transparent annular portion;
    a central portion of the planar disc member radially inward of the minimum tortilla size line being translucent whereby a central portion of the tortilla is visible and a user may inspect the surface of the tortilla therethrough; and
    indicia that divide the central portion of the planar disc member into a plurality of sectors.

2. The apparatus of claim 1 further comprising an optimum tortilla size line located on the transparent annular portion between the minimum tortilla size line and the maximum tortilla size line, the optimum tortilla size line corresponding to an optimum desired diameter for the tortilla.

* * * * *